United States Patent
Matsunaga et al.

(10) Patent No.: US 6,640,571 B2
(45) Date of Patent: Nov. 4, 2003

(54) AIR CONDITIONING APPARATUS FOR VEHICLE

(75) Inventors: Kouji Matsunaga, Kariya (JP); Hitoshi Kondo, Kariya (JP); Shinya Kaneura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/347,989

(22) Filed: Jan. 20, 2003

(65) Prior Publication Data

US 2003/0136139 A1 Jul. 24, 2003

(30) Foreign Application Priority Data

Jan. 21, 2002 (JP) ........................................ 2002-011564

(51) Int. Cl.[7] ................................................ B60H 1/32
(52) U.S. Cl. .............................. 62/244; 165/42; 165/43
(58) Field of Search ............................... 62/244; 165/42, 165/43, 41; 237/12.3 A, 12.3 R

(56) References Cited

U.S. PATENT DOCUMENTS

| 5,243,830 | A | * | 9/1993 | Ito et al. ........................ 62/344 |
| 5,478,274 | A | * | 12/1995 | Danieau ....................... 454/126 |
| 6,021,957 | A | * | 2/2000 | Takechi et al. ............. 237/12.3 A |
| 6,135,201 | A | * | 10/2000 | Nonoyama et al. ............ 165/202 |
| 6,270,400 | B1 | * | 8/2001 | Tsurushima et al. ........... 454/121 |
| 6,422,301 | B1 | * | 7/2002 | Scoccia et al. ................ 165/42 |
| 6,536,474 | B2 | * | 3/2003 | Akahane ................. 137/625.44 |

FOREIGN PATENT DOCUMENTS

| EP | 1 101 640 | 11/2000 |
| JP | 9-309320 | 12/1997 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

In an air conditioning apparatus, an air conditioning case has an upstream portion defining an air intake port through which air flows into the upstream portion substantially parallel to a core surface of a heat exchanger. The air intake port has a vertical dimension H1 that is smaller than a vertical dimension H2 of the core surface. The upstream portion has an air flow direction changing portion protruding inside of the upstream portion at a position opposite to the core surface above the air intake port. The air flow direction changing portion defines a clearance between the core surface and itself. A part of the air turned upward and further turned substantially parallel to the core surface strikes the air flow direction changing portion and flows toward the core surface through the clearance.

20 Claims, 7 Drawing Sheets

FIG. 5
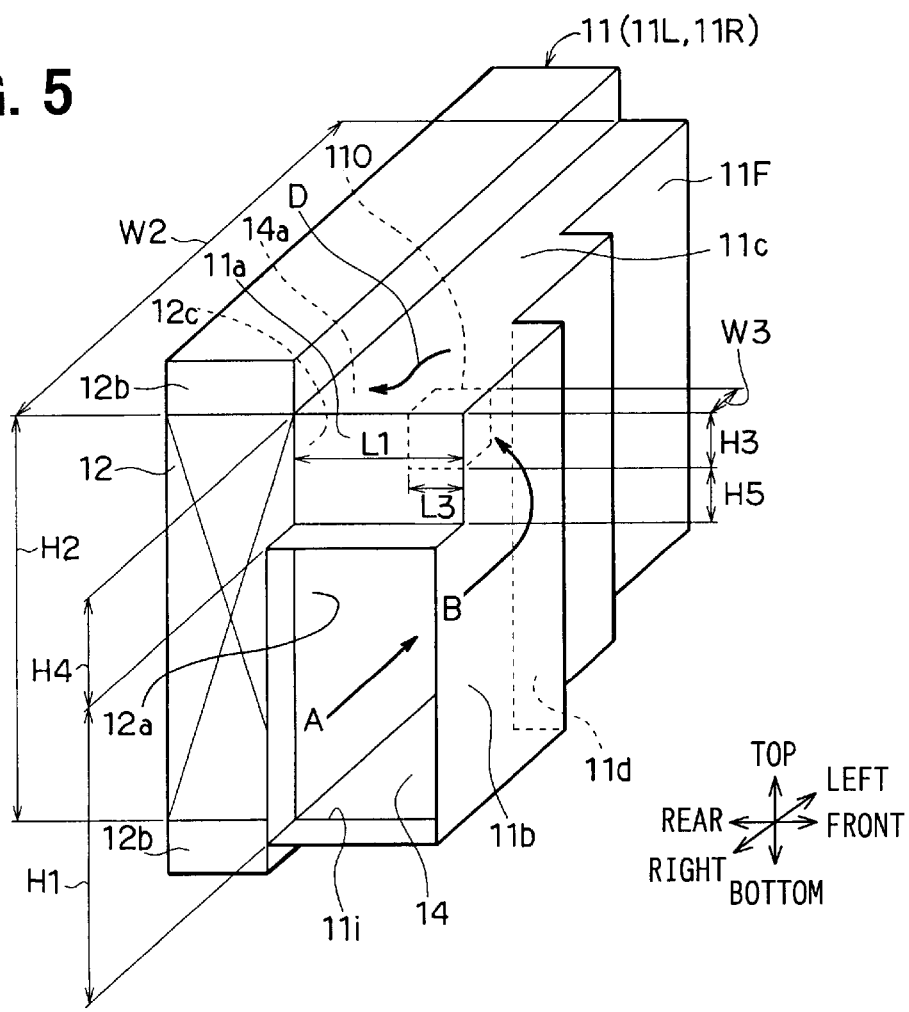
FIG. 6 [WITH AIR FLOW DIRECTION CHANGING PORTION]
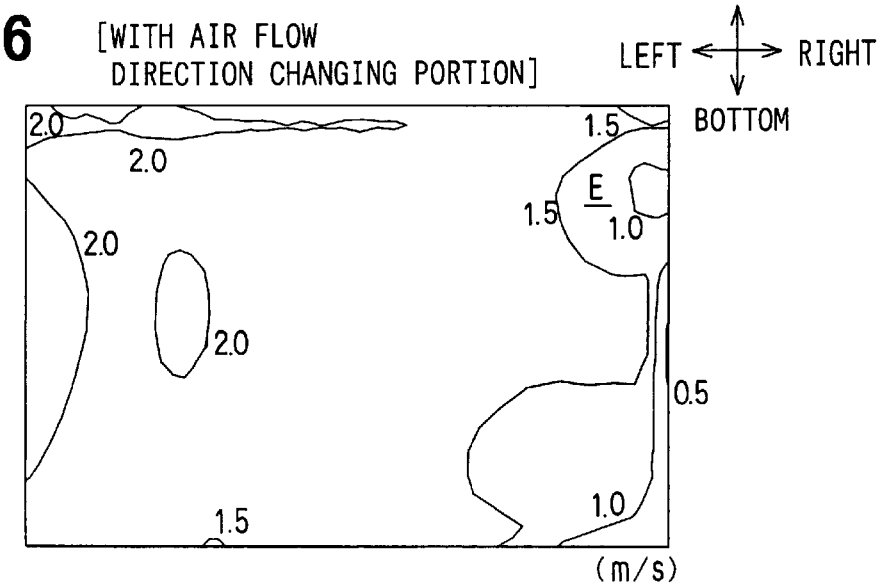
(m/s)

[WITHOUT AIR FLOW DIRECTION CHANGING PORTION]

(m/s)

AIR CONDITIONING APPARATUS FOR VEHICLE

CROSS REFERENCE TO RELATED APPLICATION

This application is based on Japanese Patent Application No. 2002-11564 filed on Jan. 21, 2002, the disclosure of which is incorporated herein by reference.

FIELD OF THE INVENTION

The present invention relates to a vehicular air conditioning apparatus having an air conditioning case into which air flows substantially parallel to a core surface of a heat exchanger.

BACKGROUND OF THE INVENTION

In a vehicular air conditioning apparatus disclosed in JP-A-9-309320, air flows into an air conditioning case from an air intake port substantially parallel to an evaporator core surface housed in the air conditioning case.

In this kind of air conditioning case, a vertical dimension of the air intake port is smaller than a vertical dimension of the core surface. Thus, air expands largely in the vertical direction in the air conditioning case right after passing through the air intake port. The air flows toward and passes through the core surface. However, if distribution of air flow speed passing through the core surface is unbalanced over the core surface, it is likely to be difficult to control temperature of air blown into a passenger compartment.

SUMMARY OF THE INVENTION

It is an object of the present invention to provide a vehicular air conditioning apparatus having an air conditioning case into which air flows substantially parallel to a core surface of a heat exchanger for cooling and in which the air is equally distributed over the core surface to pass through the core surface, without increasing air blowing noise.

According to an air conditioning apparatus for a vehicle, an air conditioning case includes an upstream portion defining an air intake space upstream in an air passage. A heat exchanger is provided in the air passage downstream from the upstream portion. The heat exchanger has a core surface through which air flows. The core surface has a dimension H2 in a predetermined direction. The upstream portion defines an air intake port having a dimension H1 in a direction substantially parallel to the predetermined direction. The dimension H1 is smaller than the dimension H2 of the core surface. The air intake space includes a first space that corresponds to the air intake port in the predetermined direction and a second space other than the first space. Also, the upstream portion has an air flow direction changing portion protruding within the second space at a position opposing the core surface with a predetermined clearance.

In the upstream portion, air passed through the air intake port partially flows into the second space and further the air partially turns in a direction substantially parallel to the core surface. The turned air strikes the air flow direction changing portion, thereby changing its flow direction toward the core surface.

Since the upstream portion has the air flow direction changing portion, air flow speed passing through the core surface does not decrease at a downstream side of the turned air flow. Therefore, equalization of distribution of the air flow speed passing through the core surface improves.

Further, since the dimension H1 of the air intake port is smaller than the dimension H2 of the core surface, the equalization of the air flow speed distribution improves without increasing air blowing noise.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 5 is a schematic perspective view of an upstream portion of an air conditioning case according to the first embodiment of the present invention;

FIG. 6 is a map to show distribution of air speed over a core surface of an evaporator according to the first embodiment of the present invention;

DETAILED DESCRIPTION OF EMBODIMENTS

Figure 1:
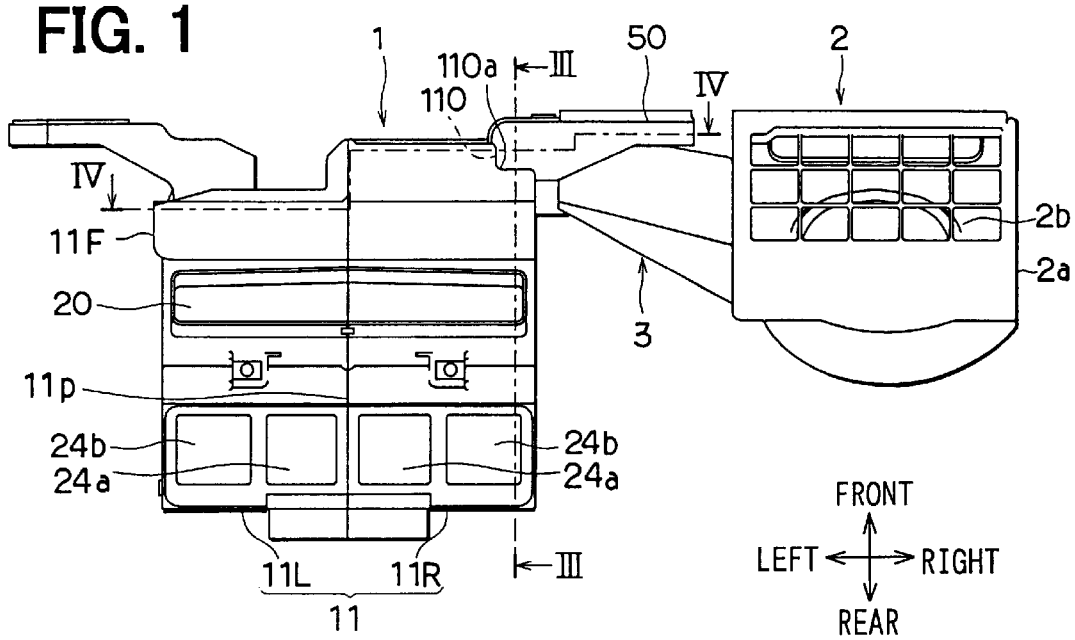
FIG. 1 is a top view of an air conditioning apparatus including an air conditioning unit and a blower unit according to the first embodiment of the present invention.

The first embodiment will be described hereinafter with reference to FIGS. 1 to 5. An internal unit of a vehicular air conditioning apparatus mainly includes an air conditioning unit 1 and a blower unit 2 for blowing air into the air conditioning unit 1.

The air conditioning unit 1 is arranged inside of an instrument panel mounted on a vehicle front portion and substantially in a middle portion in the vehicle left and right direction. In the drawings, top and bottom, front and rear, and right and left arrows denote a mounting direction of the air conditioning unit 1 with respect to the vehicle.

The blower unit 2 is located inside of the instrument panel in the vehicle front portion next to the air conditioning unit 1 on a side of an assistant driver's seat. The blower unit 2 includes an inside and outside air switching box 2a and a centrifugal blower fan 2b. The inside and outside air switching box 2a switches to intake air from the inside of a passenger compartment (inside air) and air from the outside of the passenger compartment (outside air). The blower 2a intakes air through the switching box 2a and blows it toward the air conditioning unit 1.

The air conditioning unit 1 includes a resinous air conditioning case 11. The air conditioning case 11 defines an air passages through which the air generated by the blower fan 2b flows into the passenger compartment. The air conditioning case 11 is formed by joining a left case 11L and a right case 11R at a joining surface 11p.

Figure 3:
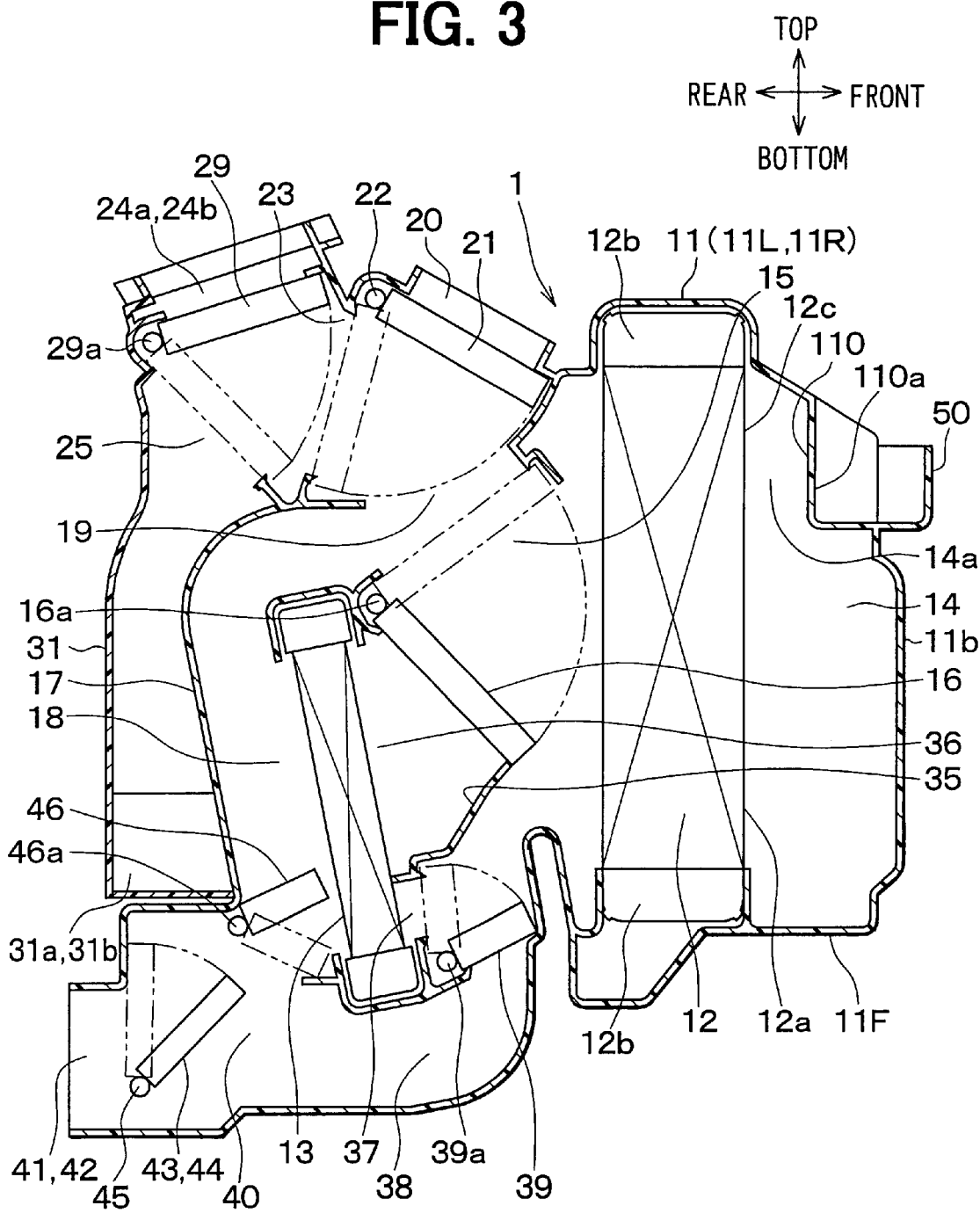
FIG. 3 is a cross-sectional view of the air conditioning unit taken along line III—III in FIG. 1.

In the air conditioning case 11, an evaporator 12 as a cooling heat exchanger and a heater core 13 as a heating heat exchanger are provided. As shown in FIG. 3, the air conditioning case 11 includes an upstream portion 11F. The upstream portion 11F is positioned at the frontmost part of the vehicle and arranged in the most air upstream side. The upstream portion 11F defines an air intake space 14 therein.

Figure 2:
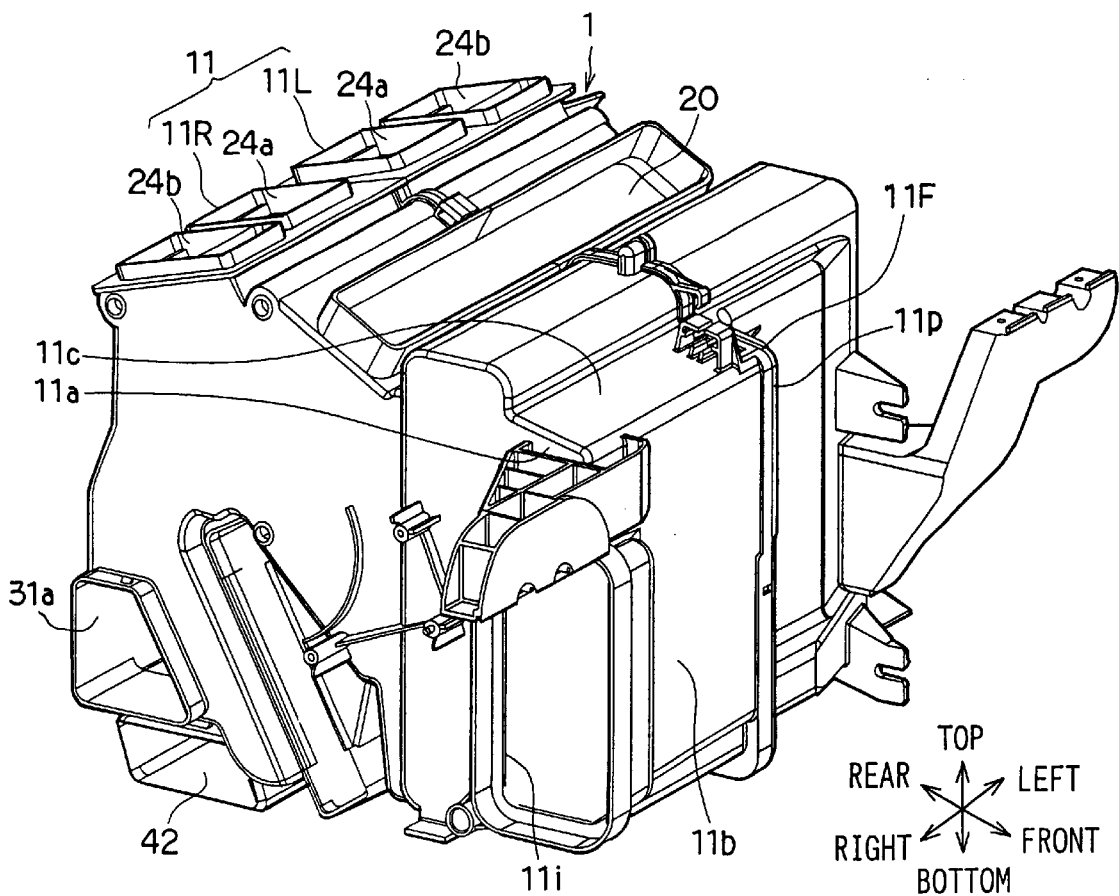
FIG. 2 is a perspective view of the air conditioning unit shown in FIG. 1.

As shown in FIG. 2, the upstream portion 11F defines an air intake portion 11i on a side surface (air intake side surface) 11a adjacent to the blower unit 2. The air intake port 11i communicates with an air outlet of the scroll casing of the blower unit 2 through a connecting duct 3, as shown in FIG. 3. Air generated by the blower fan 2b flows into the air intake space 14 through the air intake portion 11i substantially parallel with a core surface 12a of the evaporator 12. The shape and size of the air intake portion 11i will be described later in detail.

Figure 4:
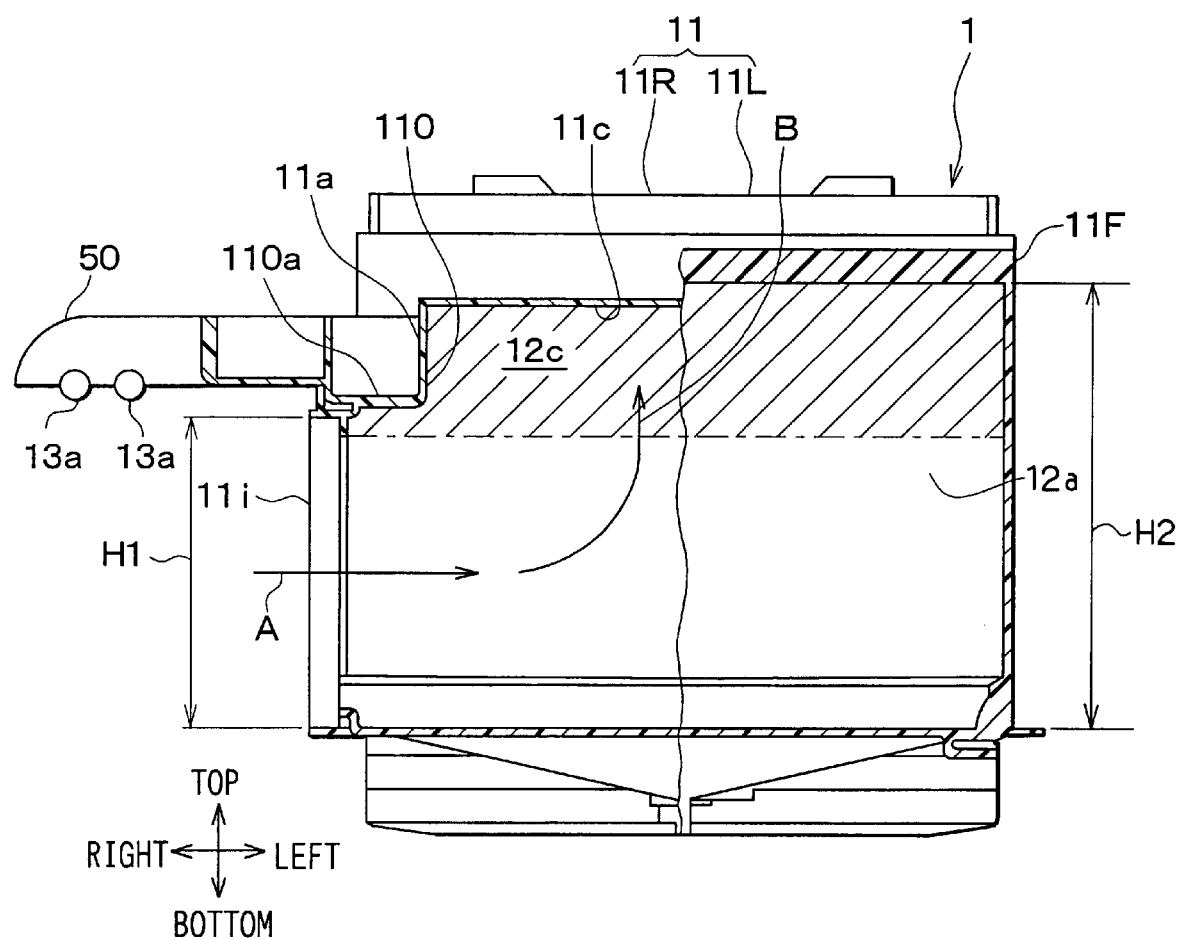
FIG. 4 is a cross-sectional view of the air conditioning unit taken along line IV—IV in FIG. 1.
Figure 9A:
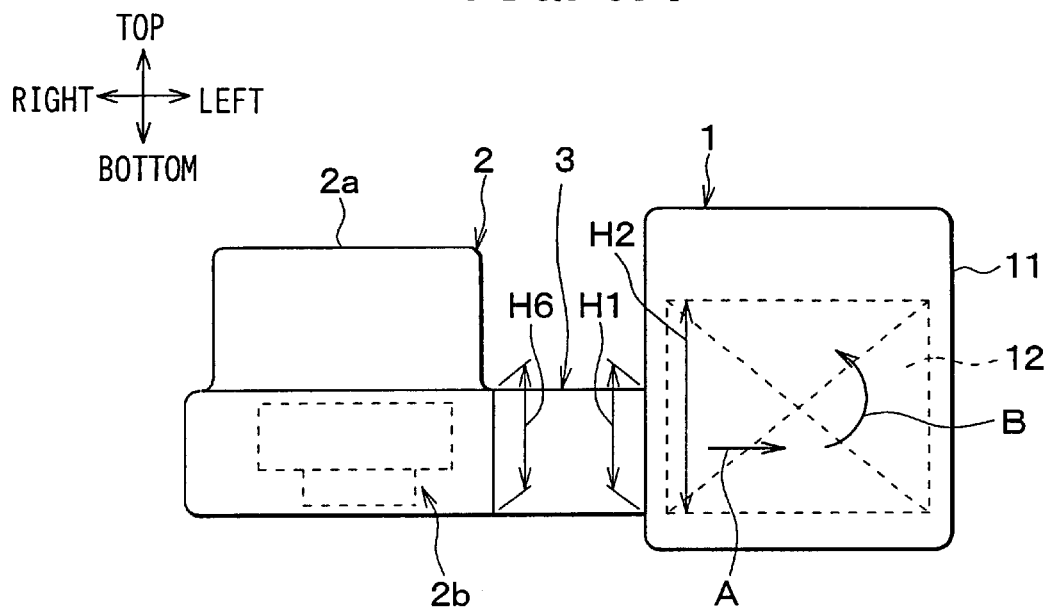
FIG. 9A is a front view of an air conditioning apparatus according to the first embodiment.

The cross-sectional area of the connecting duct 3 is substantially constant from the blower unit 2 to the air conditioning unit 1 (e.g. shown in FIG. 9A). Preferably, the vertical dimension H1 of the air intake port 11i is smaller than the vertical dimension H2 of the core surface 12a, as shown in FIG. 4. Here, the connecting duct 3 may be enlarged toward the air conditioning unit 1 as long as the dimension H1 is smaller than the dimension H2.

As shown in FIG. 3, the evaporator 12 is placed vertically, adjacent to the air intake space 14 within the air conditioning case 11. The evaporator 12 absorbs latent heat of refrigerant vaporization in a refrigerating cycle from the air to cool the air. The heater core 13 is placed downstream from the evaporator 12 (behind the evaporator 12) with a predetermined space.

The evaporator 12 includes tanks 12b and a core portion. The tanks 12b is provided at top and bottom ends of the core portion. The core portion is constructed by layering a plurality of tubes and installing corrugated fins therebetween. Here, an air upstream side surface of the core portion is referred to as the core surface 12a.

In the heater core 13, hot water (engine coolant) from an engine (not shown) circulates. The heater core 13 re-heats the cooled air having passed through the evaporator 12 by exchanging heat between the hot water and the cooled air. A cooled air bypass passage 15 is formed above the heater core 13, so that the cooled air that has passed through the evaporator 12 bypasses the heater core 13.

The air conditioning case 11 includes a wall 17 behind the heater core 13, that is, on an air downstream side of the heater core 13. The wall 17 extends vertically. The wall 17 is spaced from the heater core 13 at a predetermined distance to define a heated air passage 18. Thus, the heated air having passed through the heater core 13 is guided upwardly in the heated air passage 18. The air conditioning case 11 forms an air mixing portion 19 above the heater core 13 so that the downstream of the heated air passage 18 merges with the downstream of the cooled air bypass passage 15.

The air conditioning case 11 defines a defroster opening 20 in its top surface adjacent to the air mixing portion 19. The conditioned air of which temperature is adjusted in the air mixing portion 19 passes through the defroster opening 20. A defroster door 20, which has a plate shape, is rotatably supported with a rotation shaft 22 at the defroster opening 20. The defroster door 21 opens and closes the defroster opening 20. Also, the defroster door 21 opens and closes a communication passage 23 through which the conditioned air from the air mixing portion 19 flows toward center face openings 24a, side face openings 24b and foot communication passage 25.

The center face openings 24a and side face openings 24b are formed in the top surface of the air conditioning case 11 behind the defroster opening 20, as shown in FIGS. 1 and 2. The center face openings 24a communicates with center face air outlet (not shown) formed in the middle of the instrument panel upper portion through a center face duct (not shown).

The side face openings 24b communicates with side face air outlets (not shown) that are formed at both side ends of the instrument panel upper portion through side face ducts (not shown). The conditioned air is blown off toward passenger's upper bodies from the side and center face air outlets.

The defroster opening 20 communicates with a defroster outlet (not shown) formed on the top of the instrument panel through a defroster duct. The conditioned air is blown off toward a windshield from the defroster outlet.

A face and foot switching door 29, which has a plate shape, is rotatably supported with a rotation shaft 29a adjacent to the face openings 24a, 24b. The face and foot switching door 29 opens and closes the face openings 24a, 24b and the foot communication passage 25.

The foot air communication passage 25 is located between the face openings 24a, 24b and the wall 17 within the air, conditioning case 11, as shown in FIG. 3. The foot air communication passage 25 is open above the wall 17 continuously from the right to the left of the air conditioning case 11. The foot air communication passage 25 communicates with foot air outlets 31a, 31b that open at sides of the air conditioning case 11 below the wall 17. The conditioned air having passed through the heater core 13 passes the foot air communication passage 25 and blows off toward passengers feet area from the foot air outlets 31a, 31b.

The air conditioning case 11 includes a partition wall 35 at an air upstream side of the heat exchanging core portion of the heater core 13. The partition wall 35 divides air passages adjacent to the core portion into an upper passage 36 for front seats and a lower passage 37 for rear seats.

The partition wall 35 extends from the right to the left within the air conditioning case 11 at the air upstream side of the core portion of the heater core 13. The air passage within the air conditioning case 11 defines the cooled air bypass passage 15 for the front seats adjacent to a top portion of the heater core 13 and a cooled air bypass passage 38 for the rear seats adjacent to the lower portion of the heater core 13. The cooled air from the evaporator 12 bypasses the heater core 13 and passes through the cooled air bypass passages 15, 38.

A front air mixing door 16 for the front seat and a rear air mixing door 39 for the rear seat, each having a plate shape, are rotatably supported with the rotation shaft 16a, 39a, respectively, between the evaporator 12 and the heater core 13. The front air mixing door 16 adjusts an air ratio between the air flowing into the front seat air passage 36 to be heated by the heater core 13 and the cooled air flowing into the cooled air bypass passage 15 to bypass the heater core 13 and.

The rear air mixing door 39 adjusts an air ratio between the air flowing into the rear seat air passage 37 to be heated by the heater core 13 and the cooled air flowing into the cooled air bypass passage 38 for the rear seat to bypass the heater core 13.

The front air mixing door 16 is operated independently from the rear air mixing door 39. The front air mixing door 16 adjusts temperature of the air to be blown toward the front seats, thereby working as a front seat air temperature adjusting means. The rear air mixing door 39 adjusts temperature of the air to be blown toward the rear seats, thereby working as a rear seat air temperature adjusting means.

The air that has passed in the rear seat air passage 37 and heated by the heater core 13 merges with the cooled air that has flowed in the rear seat cooled air bypass passage 40 at a rear seat air mixing portion 40, so that the air to be blown toward the rear seat is adjusted at the predetermined temperature.

The air conditioning case 11 forms rear seat face openings 41 and rear seat foot openings 42 at the air downstream side of the air mixing portion 40. For example, the rear seat face openings 41 are located in a middle of the rear, bottom potion of the air conditioning case 11 and the foot openings 42 is located on the right and left sides of the face openings 41. Rear seat face doors 43 and foot doors 44 are rotatably supported with rotation shafts 45 adjacent to the rear seat face openings 41 and rear seat foot openings 42, respectively.

The rear seat face doors 43 and rear seat foot doors 44 independently open and close the face openings 41 and foot openings 44. With operation of the rear seat face doors 43 and foot doors 44, rear seat face mode, rear seat foot mode, rear seat high level mode and rear seat shut mode are selected. In the rear seat face mode, only the face openings 41 are open. In the rear seat foot mode, only the foot openings 42 are open, In the rear seat high level mode, the face openings 41 and foot openings 42 are open. In the rear seat shut mode, the face and foot openings 41, 42 are closed.

The rear seat face openings 41 communicate with rear seat face air outlets (not shown) through ducts (not shown), so that the conditioned air is blown off from the face air outlets toward rear passenger upper bodies. The foot openings 42 communicate with foot air outlets (not shown) through ducts (not shown), so that the conditioned air is blown off from the foot air outlets toward the rear passenger feet.

An air switching door 46 is rotatably supported with a rotation shaft 46a adjacent to the lower portion, corresponding to the rear seat air passage 37, of the heater core 13 at the air downstream side. When the air switching door 46 is operated to the position illustrated by solid line in FIG. 3, the communication between the rear seat air passage 37 and the heated air passage 18 for the front seat is interrupted.

When the switching door 46 is at the position illustrated by chain double-dashed line in FIG. 3, the communication between the rear seat air passage 37 and the air mixing portion 40 is interrupted while allowing communication between the air passage 37 and the heated air passage 18 for the front seat.

In this way, the air introduced into the air intake space 14 passes through the evaporator 12 and heater core 13 in the vehicle front and rear direction. Then, the air flows toward the defroster opening 20, the air outlets 24a, 24b, 25a and 25b.

Next, operation of the first embodiment will be described. When a face mode is selected as air blow mode, the defroster door 21 closes the defroster opening 20 so that the communication passage 23 fully opens. The face and foot switching door 29 closes the foot communication passage 25 so that face openings 24a, 24b fully open.

At this time, when the air mixing door 16 is operated to the position (maximum cooling position) illustrated by solid line in FIG. 3, the cooled air bypass passage 15 fully opens so that it is a maximum cooling state. In this state, when the blower fan 2b and the refrigerating cycle start operation, the air from the blower unit 2 flows into the air intake space 14 and is cooled at the evaporator 12.

In this maximum cooling state, the cooled air passes through the cooled air bypass passage 15 and flows toward the face openings 24a, 24b through the air mixing portion 19 and the air communication passage 23. Then, the cooled air blows off toward the passenger upper bodies from the face air outlets.

To control the temperature of the air to be blown off into the passenger compartment, the air mixing door 16 is operated closer to the position (maximum heating position) illustrated by the chain double dashed line. In accordance with an opening degree of the air mixing door 16, the air mixing ratio between the cooled air from the cooled air bypass passage 15 and the heated air from the heated air passage 18 is controlled in the air mixing portion 19, thereby controlling the temperature of the air.

Next, when the foot mode is selected as the air blow mode, the defroster door 21 is operated to a position where the defroster openings 20 is slightly open and the communication passage 23 is almost open. The face and foot switching door 29 is operated to a position where the face openings 24a, 24b are closed and the foot communication passage 25 is fully open.

The conditioned air (heated air), which is conditioned at the predetermined temperature by the operation of the air mixing door 16, flows into a foot duct 31 defined behind the wall 17 through the communication passage 23 and foot communication passage 25. Then, the conditioned air blows off from the foot air outlets 31a, 31b toward the passengers feet, thereby heating the passengers lower bodies. Also in this mode, the conditioned air partially flows to the defroster opening 20 and blows off from the defroster air outlet (not shown) toward the windshield, thereby suppressing the frost of the windshield.

In addition to the face mode and foot mode, a high level mode, a foot defroster mode and a defroster mode are selected. In the high level mode, the face openings 24a, 24b and foot communication passage 25 are open. In the foot defroster mode, the defroster opening 20 and foot communication passage 25 are open at substantially same degrees. In the defroster mode, the defroster opening 20 is fully open and the communication passage 23 is closed. Further, the above described rear seat face mode, rear seat foot mode, rear seat high level mode, rear seat shut mode and the like are selected.

Next, the upstream portion 11F and the air intake port 11i will be described in detail.

As shown in FIG. 4, the air intake port 11i extends from the bottom end toward the top end of the core surface 12a. The height H1 of the air intake port 11i in a direction substantially parallel to the core surface 12a is shorter than the height H2 of the core surface 12a. Air flows into the air intake space 14 substantially parallel to the core surface 12a from the air intake port 11i as denoted by an arrow A in FIG. 5. Then, the air strikes against a perpendicular side wall 11d of a front wall 11b. The front wall 11b faces the core surface 12a and has a step shape. The perpendicular side wall 11d is substantially perpendicular to the core surface 12a.

Then, a part of the air having struck against the perpendicular side wall 11d turns up to a space corresponding to an enlarged area 12c as denoted by an arrow B. The enlarged area 12c is a part of the core surface 12a above the top end of the air intake port 11i, and is a diagonally shaded area in FIG. 4. Thus, the air expands vertically with respect to the core surface 12a. Further, a part of the air tuned upward strikes a top wall 11c and turns toward the air intake port 11i to be substantially parallel to the core surface 12a.

The upstream portion 11F has an air flow direction changing portion 110 protruding within the air intake space 14. A predetermined space 14a is defined between the core surface 12a and the air flow direction changing portion 110. Therefore, the air that is turned toward the air intake port 11i the top wall 11c strikes the air flow direction changing portion 110 and changes its direction to flow toward the core surface 12a through the space 14a as denoted by an arrow D in FIG. 5.

Specifically, the air flow direction changing portion 110 has substantially a cubic shape or substantially a rectangular parallelopiped shape such that at least three sides are exposed to the inside of the air intake space 14. The air flow direction changing portion 110 is located at a corner defined with the front wall 11b, the top wall 11c, and the air intake side wall 11a. The front wall 11b faces the core surface 12a. The top wall 11c is substantially perpendicular to the core surface 12a and the front wall 11a. The top wall 11c connects the top of the core surface 12a and the top of the front wall 11c.

The front wall 11b has a step-shape such that a distance between the core surface 12a and the front wall 11b is decreased from the air intake side wall 11a to the opposite side wall, thereby suppressing an increase in air flow speed in a direction away from the air intake port 11i. That is, the front wall 11b is to equalize the distribution of the air flow speed, in the direction of the arrow A, passing through the core surface 12a.

Here, H3, L3, and W3 refer to dimensions of the air flow direction changing portion 110, as shown in FIG. 5. H3 is the height dimension from the top wall 11c to its lower end. L3 is the length dimension from the front wall 11b to its end adjacent to the core surface 12a. W3 is the width dimension from the air intake side wall 11a toward the vertical end wall 11d. Further, W2 refers to the dimension (width) of the core surface 12a in the right and left direction. L1 refers to the dimension of the air intake port 11i in the front and rear direction, that is, substantially perpendicular to the core surface 12a. H4 is a difference between the dimensions H1 and H2.

It is preferable that those dimensions of the air flow direction changing portion 110 satisfy one of the following relations:

$0.05 \times W2 \leq W3 \leq 0.45 \times W2$;

$0.25 \times L1 \leq L3 \leq 0.80 \times L1$;

$0.25 \times H4 \leq H3 \leq H4$; or $0.10 \times H1 \leq H3 \leq 0.45 \times H1$.

Here, the air flowing from the air intake port 11i expands in the vertical direction after passing through the air intake port 11i. If the dimension (height) H3 is substantially same as the dimension H4, the air flow direction changing portion 110 disturbs this main air flow. Therefore, it is preferable that the dimension H3 is smaller than the dimension H4.

As shown in FIGS. 3 and 4, the air flow direction changing portion 110 is made by denting the outer wall of the upstream portion 11F inward, so that a recessed portion (dent portion) 110a is formed on the upstream portion 11F. For example, a bracket 50 for holding a hot water pipe 13a connecting with the heater core 13 can be mounted on the recessed portion 110a. Thus, the air conditioning unit 1 is reduced in size. Further, other members, such as a connecting member for connecting the air conditioning unit 1 and the blower unit 2, can be mounted on the recessed portion 110a. The bracket 50 also functions as the connecting member. Also, the bracket 50 can hold a refrigerant pipe of the evaporator 12.

Figure 10:
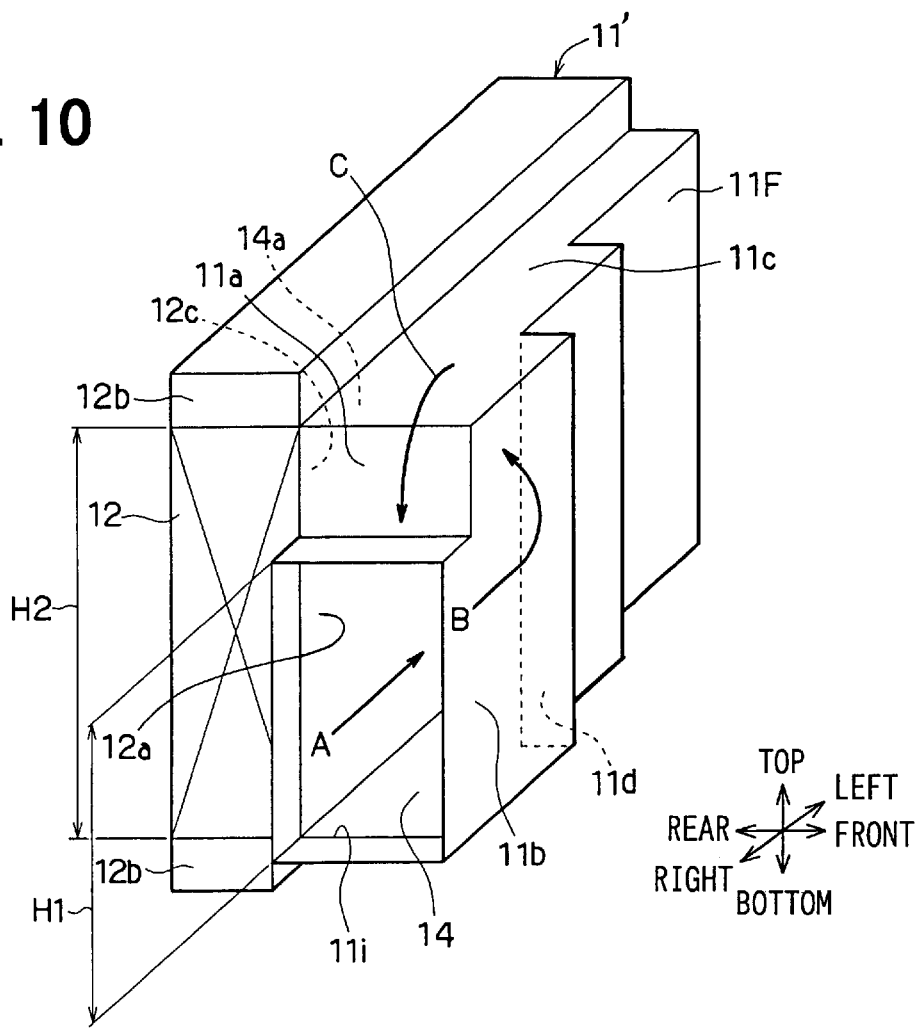
FIG. 10 is a schematic perspective view of an air conditioning case as a comparison to that of the first embodiment.

Next, effects and advantages of the first embodiment will be described hereinafter, in comparison with an air conditioning case 11' shown in FIG. 10. The air conditioning case 11' has a substantially similar shape to that of the air conditioning case 11 of the first embodiment, but does not have the air flow direction changing portion 110.

Figure 11:
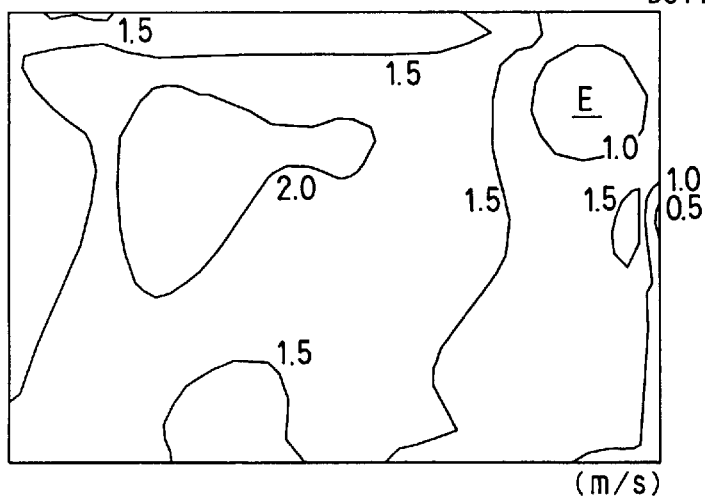
FIG. 11 is a map to show distribution of air speed over a core surface of an evaporator in the comparison air conditioning case shown in FIG. 10.

In the comparison air conditioning case 11', the air turned upward as denoted by the arrow B strikes against the top wall 11c and turns toward the air intake port 11i. Thus, the air flows back toward the air intake port 11i substantially parallel to the core surface 12a as denoed by an arrow C in FIG. 10. With this, air flow speed passing through the core surface 12a is reduced at the downstream side of the air flow. As a result, the distribution of the air speed passing through the core surface 12a becomes unbalance over the core surface 12a, as shown in FIG. 11. The air flow speed decreases especially around area E in FIG. 11.

Figure 9B:
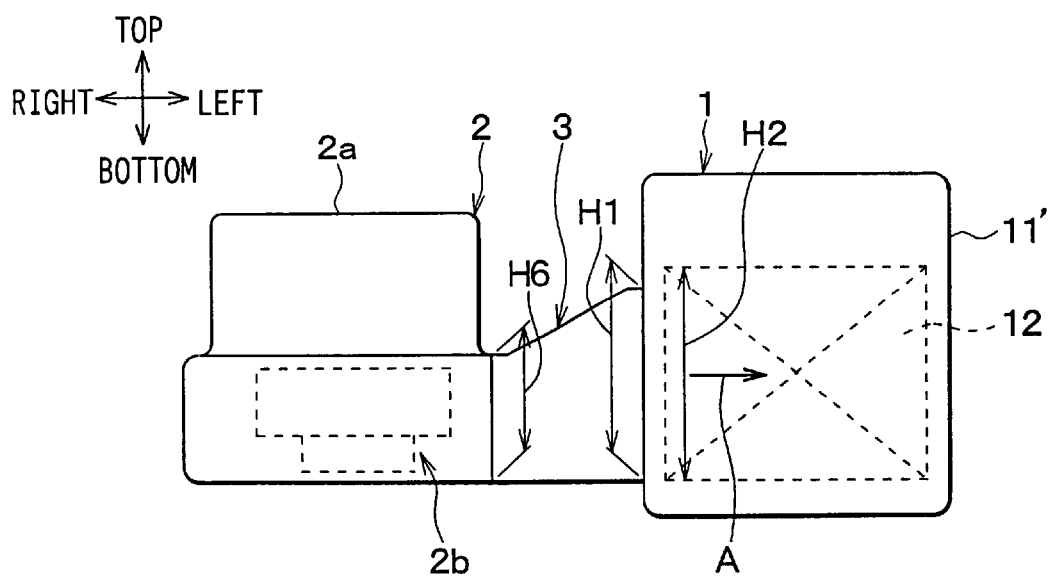
FIG. 9B is a front view of an air conditioning apparatus as a comparison to that of the first embodiment.

Also in a case that the evaporator 12 is arranged horizontally, a similar result is obtained by the same reason. Here, in order to restrict the turning of the air flow denoted by the arrow C to equalize the distribution of the air flow speed, it is conceivable to make the dimension H1 of the air intake port 11i substantially same as the dimension H2 of the core surface 12a, as shown in FIG. 9B. In this case, however, because the dimension H1 is larger than the dimension H6 of the blow off port of the blower fan 2b, air blowing noise increases.

On the other hand, in the air conditioning case 11 of the first embodiment, the upstream portion 11F has the air flow direction changing portion 110. A part of the air that struck against the top wall 11c and turned substantially parallel to the core surface 12a strikes the air flow direction changing portion 110 and flows toward the core surface 12a through the space 14a, as denoted by an arrow D in FIG. 5. That is, the air flow denoted by the arrow C in FIG. 10 is forcibly directed toward the core surface 12a by the air flow direction changing portion 110.

Thus, the air flow speed passing through the core surface 12a increases at the downstream side of the air flow, that is, around area E in FIG. 6, as compared with that in the comparison air conditioning case 11'. Therefore, the equalization of the distribution of the air flow speed improves over the core surface 12a. Numerals in FIGS. 6 and 11 denote air flow speed (m/s) when the air flow amount from the air intake port 11i is 571 m³/h.

Accordingly, in the air conditioning case 11 of the first embodiment, the balance of the air flow speed distribution is improved over the core surface 12a by the air flow direction changing portion 110, without increasing the air blowing noise.

Figure 7:
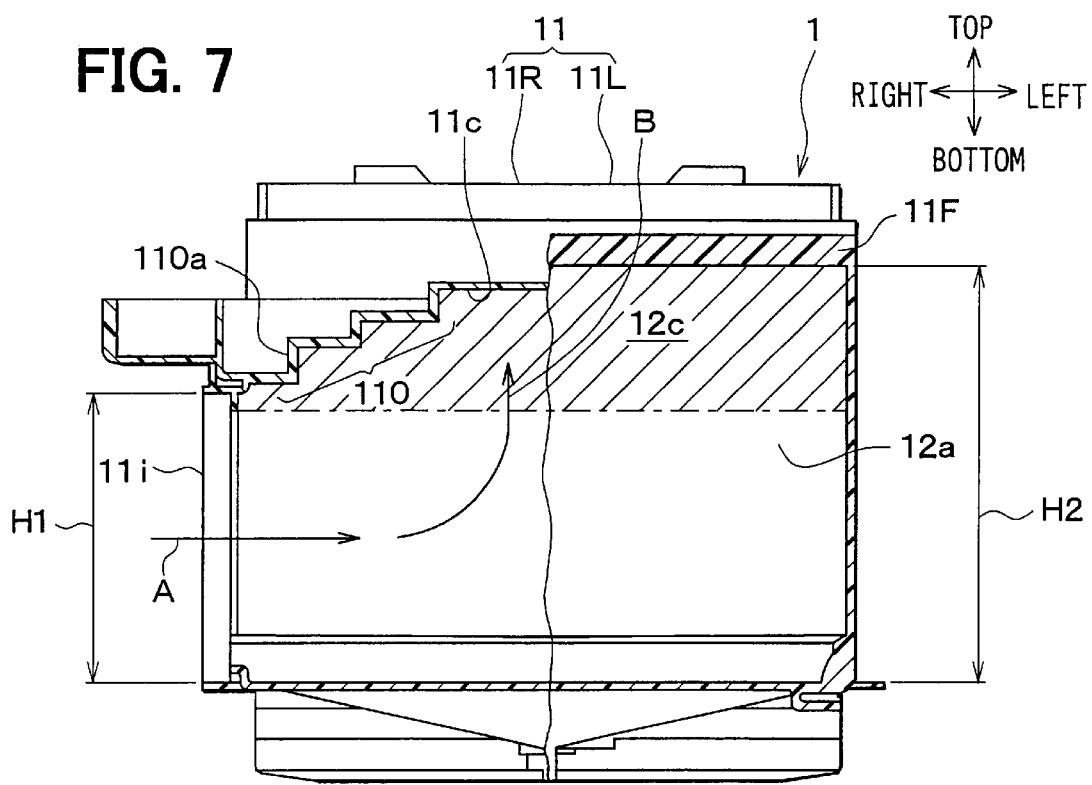
FIG. 7 is a cross-sectional view of an air conditioning unit according to the second embodiment of the present invention.

In the second embodiment, the air flow direction changing portion 110 is modified into a step shape from the cubic shape, as shown in FIG. 7. The dimension H3 increases stepwise from the upstream side to the downstream side of the turning air flow (from the right to the left in FIG. 7). In this air conditioning case 11, advantages similar to those of the first embodiment can be obtained.

Figure 8:
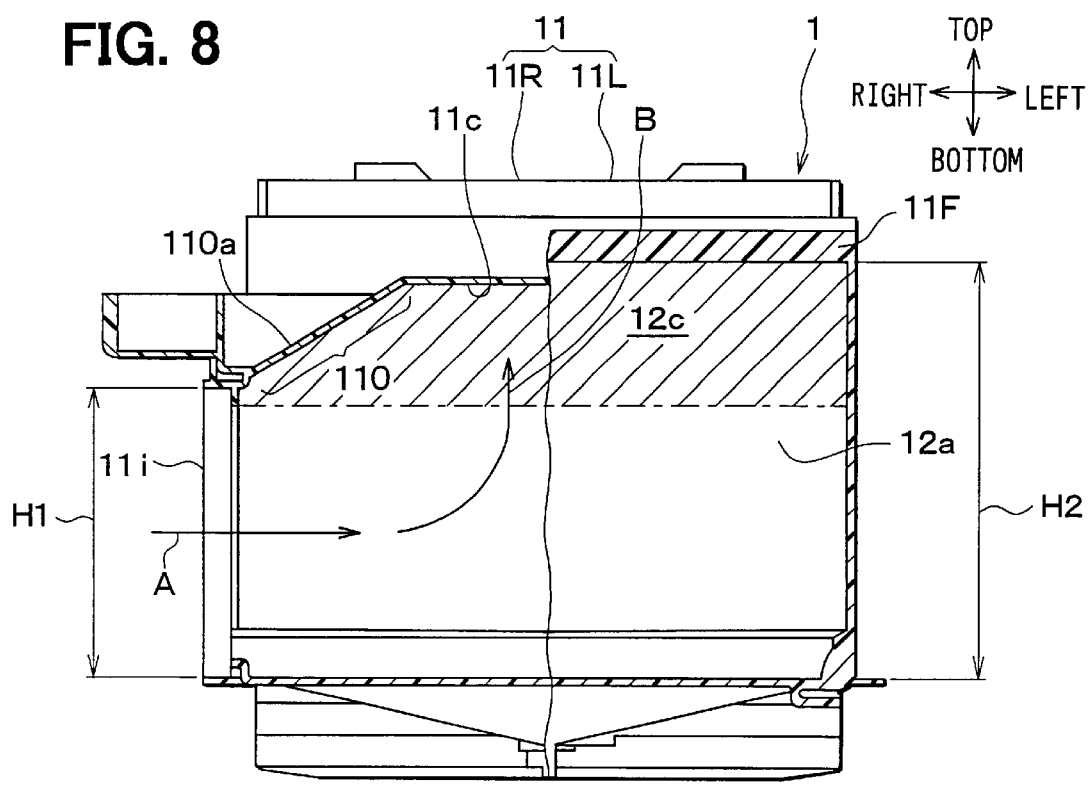
FIG. 8 is a cross-sectional view of an air conditioning unit according to the third embodiment of the present invention.

In the third embodiment, the air flow direction changing portion 110 is tapered, as shown in FIG. 8. That is, the top wall 11c defining the air flow direction changing portion is sloped downward toward the air intake port 11i. In this air conditioning case 11, advantages similar to those of the first embodiment can be obtained.

In the first to the third embodiments, the evaporator 12 is placed vertically. However, the evaporator 12 can be placed horizontally, for example. Although the front wall 11b has step shape, the shape of the front wall 11b can be changed.

The present invention should not be limited to the disclosed embodiments, but may be implemented in other ways without departing from the spirit of the invention.

What is claimed is:

1. An air conditioning apparatus for a vehicle comprising:
    an air conditioning case defining an air passage therein, the air conditioning case including an upstream portion defining an air intake space upstream in the air passage; and
    a heat exchanger provided in the air passage downstream from the upstream portion, the heat exchanger defining a core surface through which air flows, the core surface having a dimension H2 in a predetermined direction;
    wherein the upstream portion defines an air intake port through which the air flows into the upstream portion substantially parallel to the core surface, the air intake port has a dimension H1 in a direction substantially parallel to the predetermined direction, the dimension H1 is smaller than the dimension H2 of the core surface, the air intake space includes a first space that corresponds to the air intake port in the predetermined direction and a second space, such that air passed through the air intake port partially flows into the second space and the air partially turns in a direction substantially parallel to the core surface, and
    wherein the upstream portion has an air flow direction changing portion protruding within the second space at a position opposing the core surface with a predetermined clearance, the air flow direction changing portion is arranged such that the air turned substantially parallel to the core surface strikes the air flow direction changing portion, thereby changing its flow direction toward the core surface.

2. The air conditioning apparatus according to claim 1, wherein the heat exchanger performs heat exchange to cool the air passed therethrough.

3. The air conditioning apparatus according to claim 1, wherein the air flow direction changing portion has a rectangular parallelopiped shape so that at least three sides are exposed within the air intake space.

4. The air conditioning apparatus according to claim 1, wherein the air flow direction changing portion is tapered such that its dimension in the predetermined direction is gradually decreased in a direction away from the air intake port.

5. The air conditioning apparatus according to claim 1, wherein the air flow direction changing portion has a step shape such that its dimension in the predetermined direction decreases stepwise in a direction away from the air intake port.

6. The air conditioning apparatus according to claim 1,
    wherein a dimension H4 is a difference between the dimension H2 of the core surface and the dimension H1 of the air intake port in the predetermined direction, and the air flow direction changing portion has a dimension H3 in the predetermined direction,
    wherein the air flow direction changing portion is constructed such that the dimensions H3 and H4 satisfy a relation $0.25 \times H4 \leq H3 \leq H4$.

7. The air conditioning apparatus according to claim 1,
    wherein the air intake port has a dimension L1 in a direction substantially perpendicular to the core surface, and the air flow direction changing portion has a dimension L3 in a direction substantially perpendicular to the core surface,
    wherein the air flow direction changing portion is constructed such that the dimensions L1 and L3 satisfy a relation $0.25 \times L1 \leq L3 \leq 0.80 \times L1$.

8. The air conditioning apparatus according to claim 1,
    wherein the core surface has a dimension W2 in a direction substantially perpendicular to the predetermined direction, and the air flow direction changing portion has a dimension W3 in a direction substantially perpendicular to the predetermined direction,
    wherein the air flow direction changing portion is constructed such that the dimensions W1 and W3 satisfy a relation $0.05 \leq W2 \leq W3 \leq 0.45 \times W2$.

9. The air conditioning apparatus according to claim 1, wherein the air flow direction changing portion is dented from an outside wall of the upstream portion.

10. The air conditioning apparatus according to claim 9, further comprising:
    a connecting member for connecting the air conditioning case with a blower for blowing air to the air conditioning case,
    wherein the connecting member is mounted on a dent of the upstream portion.

11. The air conditioning apparatus according to claim 9, further comprising:
    a bracket for holding a pipe through which a fluid for the heat exchanger flows,
    wherein the bracket is mounted on a dent of the upstream portion.

12. The air conditioning apparatus according to claim 1,
    wherein the upstream portion includes a side wall in which the air intake port is formed,
    wherein the side wall is substantially perpendicular to the core surface.

13. The air conditioning apparatus according to claim 1,
    wherein the upstream portion includes an end wall facing the core surface,
    wherein the end wall has a step shape such that a distance between the core surface and itself decreases stepwise in a direction away from the air intake port.

14. The air conditioning apparatus according to claim 1,
    wherein the upstream portion includes a first wall in which the air intake port is formed, a second wall facing the core surface and a third wall extending substantially perpendicular to the first wall,
    wherein the air flow direction changing portion is formed at a corner defined with the first, second and third walls.

15. The air conditioning apparatus according to claim 14, wherein the first wall extends substantially perpendicular to the core surface.

16. The air conditioning apparatus according to claim 14, wherein the second wall has a step shape such that a distance between the core surface and itself decreases stepwise in a direction away from the air intake port.

17. The air conditioning apparatus according to claim 1, wherein the predetermined direction is substantially a vertical direction.

18. The air conditioning apparatus according to claim 17, wherein the air intake port is formed such that air flows into the upstream portion substantially in a horizontal direction.

19. The air conditioning apparatus according to claim 17, wherein the second space of the air intake space is located above the first space.

20. The air conditioning apparatus according to claim 1, further comprising:
a blower case including a blower for blowing air to the air conditioning case,
wherein the air conditioning case are mounted in an instrument panel of the vehicle, at a substantially middle portion in right and left direction of the vehicle, and the blower case is offset from the air conditioning case toward a passenger seat of the vehicle in the instrument panel.

* * * * *